United States Patent [19]

Bawden et al.

[11] Patent Number: 5,929,341
[45] Date of Patent: Jul. 27, 1999

[54] STRESS MEASURING ROCK SUPPORT DEVICE

[75] Inventors: William F. Bawden, Kingston; Andrew J. Hyett, Glenburnie, both of Canada

[73] Assignee: Canadian Mining Industry Research Organization, Sudbury, Canada

[21] Appl. No.: 08/978,600

[22] Filed: Nov. 26, 1997

[30] Foreign Application Priority Data

Mar. 24, 1997 [CA] Canada ................................ 2200834

[51] Int. Cl.⁶ .................................................. G01N 3/00
[52] U.S. Cl. .......................................... 73/784; 73/152.59
[58] Field of Search .............................. 73/784, 152.01, 73/152.48, 152.49, 152.59

[56] References Cited

U.S. PATENT DOCUMENTS

| | | | |
|---|---|---|---|
| 3,820,384 | 6/1974 | Brill | 73/784 |
| 3,828,435 | 8/1974 | Baker | 33/1 H |
| 3,872,719 | 3/1975 | Beus et al. | 73/784 |
| 4,382,335 | 5/1983 | Frank . | |
| 4,461,171 | 7/1984 | de la Cruz . | |
| 4,542,655 | 9/1985 | Park . | |
| 4,719,803 | 1/1988 | Capelle . | |
| 4,803,888 | 2/1989 | Choquet . | |
| 4,962,668 | 10/1990 | Preston . | |
| 5,236,144 | 8/1993 | Kautz . | |
| 5,540,101 | 7/1996 | Capelle et al. | 73/784 |
| 5,570,976 | 11/1996 | Fuller et al. | 405/302.2 |
| 5,585,555 | 12/1996 | McRae | 73/784 |

FOREIGN PATENT DOCUMENTS

| | | | |
|---|---|---|---|
| 2200834 | 3/1997 | Canada . | |
| 1484533 | 5/1969 | Germany | E02D 33/00 |
| 3636322 | 5/1988 | Germany | G01B 7/16 |
| 645979 | 10/1984 | Switzerland | G01B 7/16 |

OTHER PUBLICATIONS

E. Hoek, P.K. Kaiser and W.F. Bawden "Support of Underground Excavations in Hard Rock", 1995, pp. 152–164.
Patent Abstracts of Japan, vol. 095, No. 009, Oct. 31, 1995 & JP 07 150561 A (Moriya Koki KK), Jun. 13, 1995.

*Primary Examiner*—Max H. Noori
*Attorney, Agent, or Firm*—George J. Primak

[57] ABSTRACT

A stress measuring rock support device is provided, such as a cable bolt or friction stabilizer, which has an internal longitudinal cavity, such as a groove or a flat section on the kingwire or a hollow core in the kingwire or the like. One or more rigid wires or filaments extend in such cavity and their ends are anchored at predetermined anchor points within the cavity. The other ends of the rigid wires or filaments are spring-loaded and are provided with movable actuators having electrical contacts which are in contact with a linear potentiometer and measure the displacement of the actuators resulting from the stretch of the cable. This is then correlated to measure the cable load or strain resulting from the stress applied to the rock support device. The spring-loaded arrangement as well as the linear potentiometer and the actuators with electrical contacts are enclosed within a suitable cover to form an instrumentation head assembly for the rock support device.

24 Claims, 10 Drawing Sheets

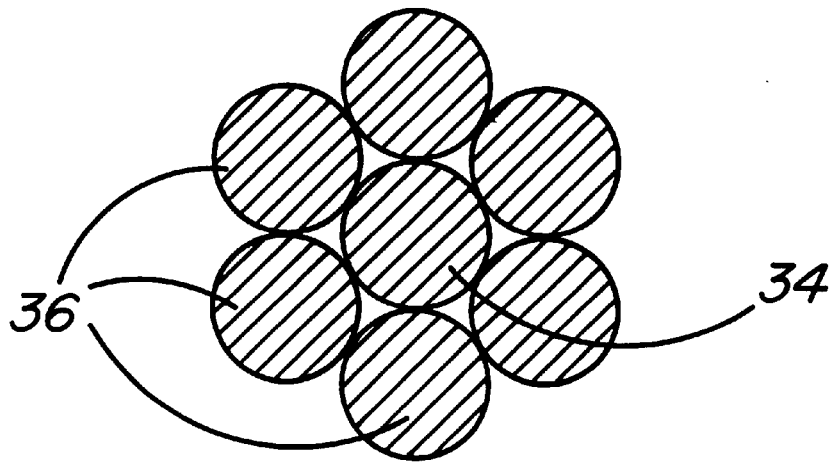
Fig. 2
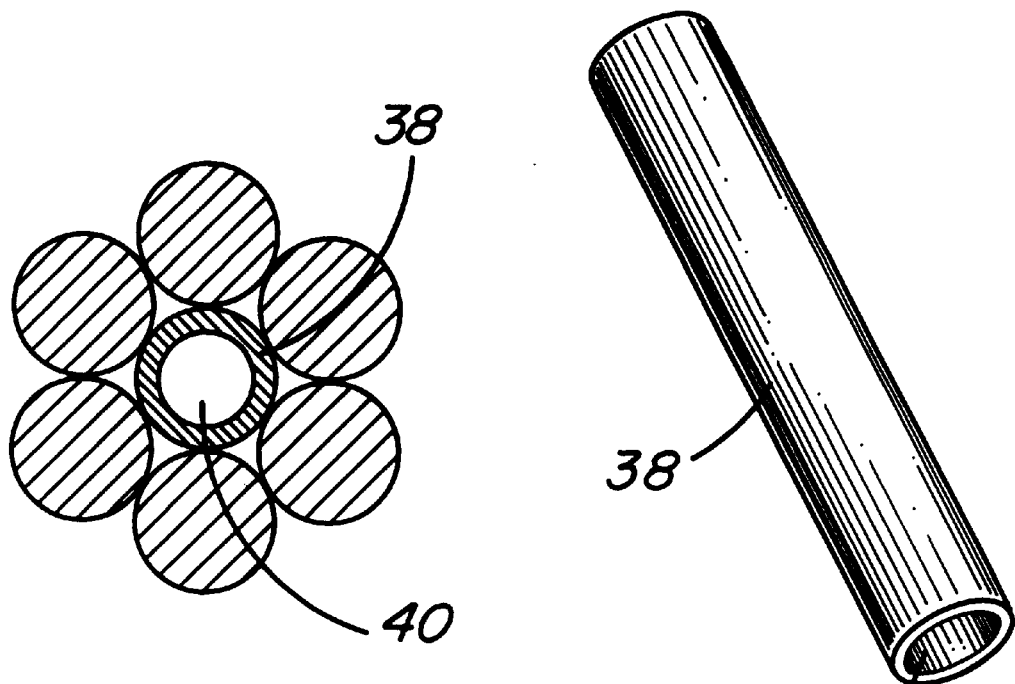
Fig. 3
Fig. 4

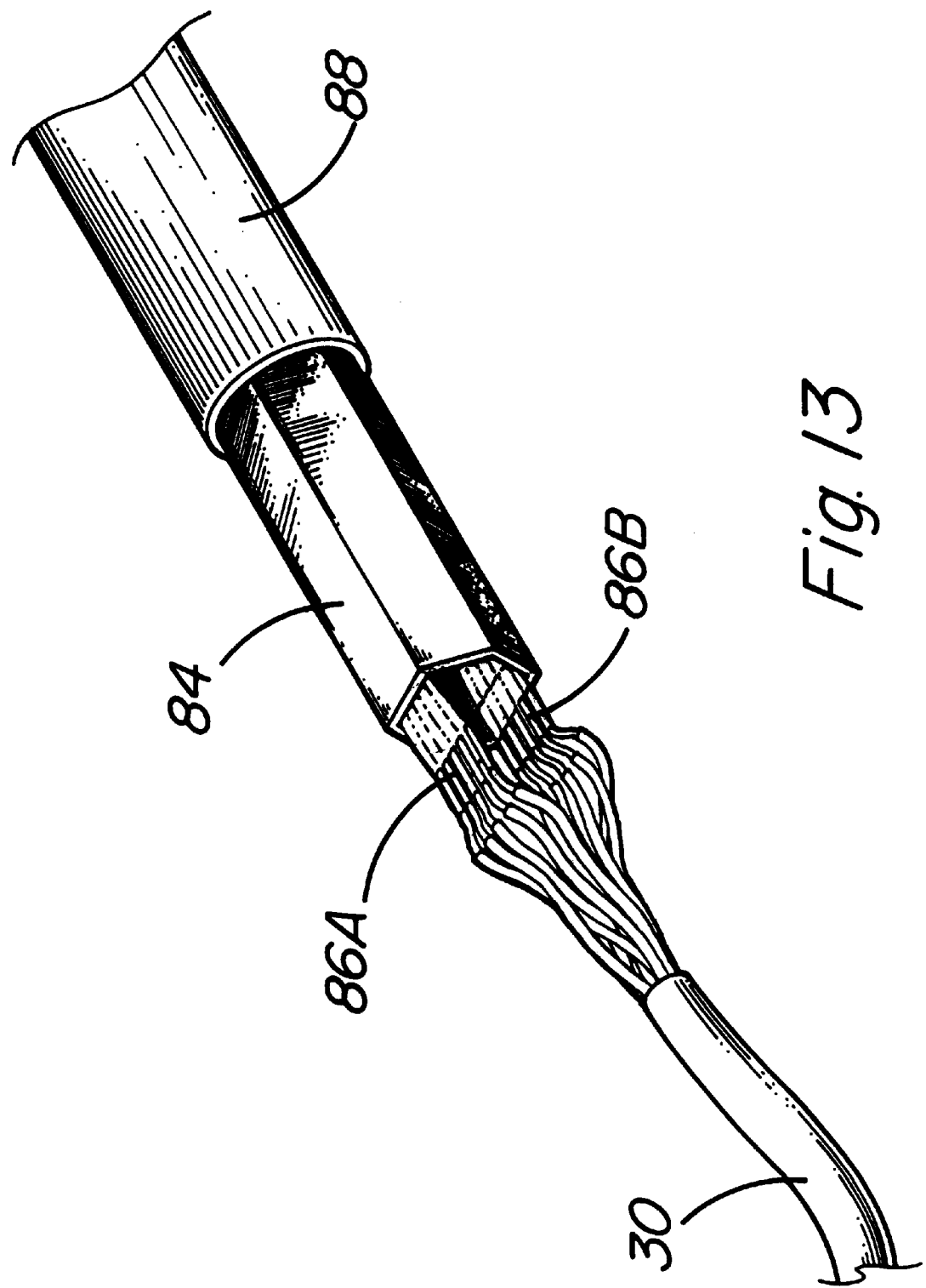

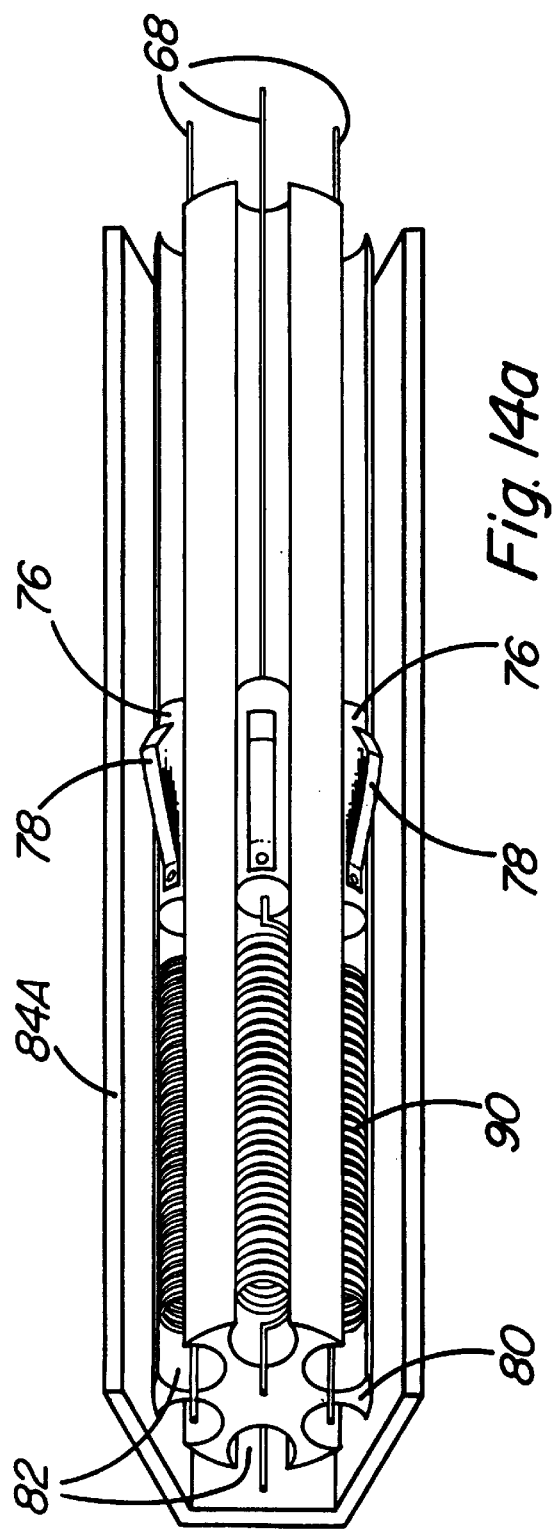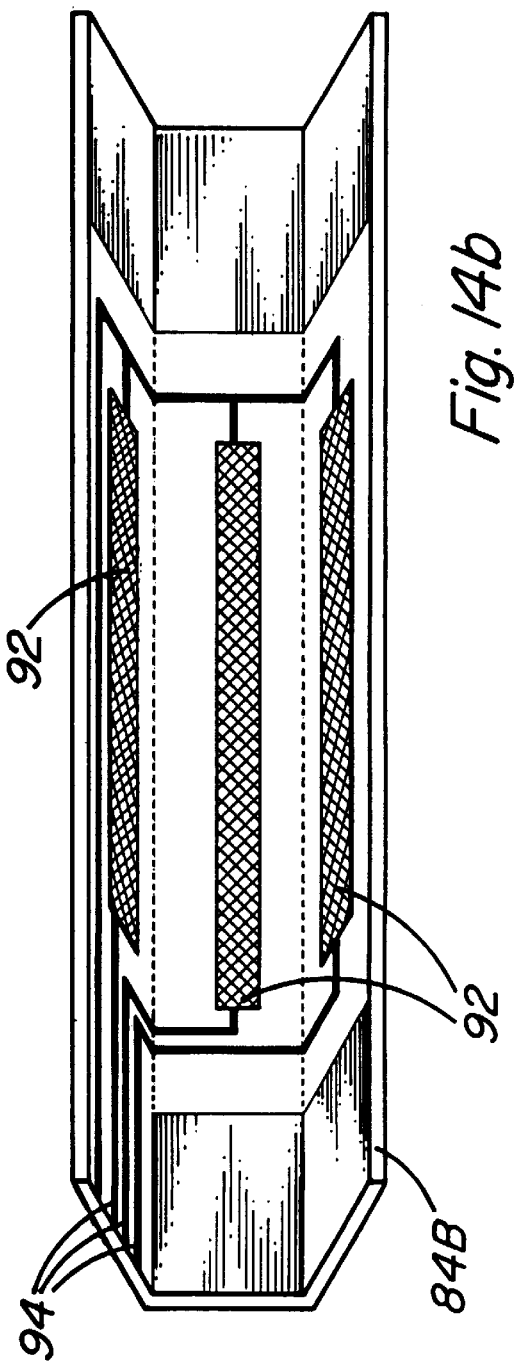
Fig. 14a
Fig. 14b

STRESS MEASURING ROCK SUPPORT DEVICE

BACKGROUND OF THE INVENTION

1. Field of the Invention

This invention relates to a stress measuring rock support device and, more particularly, to a mechanism for determining and measuring axial tensile load or strain on a cable bolt, friction stabilizer or similar means used for supporting rock strata.

2. Brief Description of the Prior Art

It is desirable in mining operations, for maximum extraction of ore at various depths, to mine blocks of ore of the largest possible dimensions. The limiting factor for the design is the strength of the rock in the vicinity of the ore body, which prior to mining may be inherently weak or highly fractured due to geological conditions. In situations where the strength of the ore body is exceeded, the implication for personnel safety as well as for "dilution" of the ore by the surrounding waste rock, loss of reserves, and the like, are very serious.

A universally accepted engineering solution to this problem is to reinforce the rock using steel cable bolts or dowels or similar devices cemented or forced into boreholes. The basic principle, much the same as that for reinforced concrete, is to provide the additional strength required to enable the rock to support itself. A good description of such rock bolts, dowels and the like, and of the manner in which they are used, is provided in the book entitled "Support of Underground Excavations in Hard Rock" by E. Hoek, P. K. Kaiser and W. F. Bawden, particularly at pp. 152–164, published by A. A. Balkema/Rotterdam/Brookfield in 1995.

However, as with any composite involving cement or concrete, the weakest link is the contact between the different components. For a cable bolt this corresponds to the cable/grout interface, and often results in failure due to slip at the cement-steel interface at loads to significantly less than that required to rupture the steel cable.

To counteract this problem, several recent innovations have involved the modification of the basic cable geometry by opening up the weave of the cable enough to allow the cement to flow between the individual wires, thus creating a stronger "mechanical" interlock between the cement and the cable. Such alternatives offer benefits and drawbacks with respect to performance, installation convenience and price. At present, the so called "bulge" and "nutcase" cables are modified geometry cable bolts that are often used in Canadian mines. A third modified cable, the Garford™ bulb anchor cable, is also being introduced into Canadian mines.

Modified cable geometries will provide more effective cable support in poor quality ground and under adverse mining conditions, however their widespread acceptance is dependent on further non-site specific evaluation and monitoring of performance. More importantly, if modified cable bolt designs are to be optimized, i.e. both as to pattern and length, instrumentation is required to directly and accurately monitor the loads that modified geometry cables are subject to under various in-situ conditions. Also, there will always be a significant use of conventional 7-wire stranded cable bolts and it is important to be able to adapt such cable bolt construction so that it may also be accurately and effectively monitored. Moreover, friction stabilizers, such as the Split Set™ stabilizer produced by Ingersoll-Rand, would also greatly benefit from accurate monitoring of the tensile load or strain to which they may be subjected.

The basic requirements for such instrumentation are as follows: (i) it should be easy to install even under adverse conditions; (ii) it should have adequate sensitivity and accuracy for the intended purpose, but also be able to perform under a range of expected displacements; (iii) it should be robust and be suitably protected to ensure durability for the required duration of operation; (iv) it should be easy to read and results should be immediately available to the operator; (v) it should not interfere with the effectiveness of the rock support means, such as the cable bolt or friction stabilizer, and (vi) it should be of low cost so as to be within the financial range of most operations.

Efforts have been made to produce such a monitoring gauge using a resistance wire concept. U.S. Pat. No. 4,803,888 of Feb. 14, 1989 describes one such resistance wire measuring gauge. However, the basic problem with resistance wire monitors, is that resistance wires, such as Nichrome, yield at about 0.5% strain, while the cable which they measure may yield at, for example, 0.8% strain. Thus, when the cable is under high load, the resistance wire starts to yield while the cable is still elastic and no accurate reading can be obtained under such conditions.

Another problem with such devices is that the resistance wires are attached to the exterior of the cable, i.e. at the cable-grout interface, which is the interface at which failure and slip occur as the cable is progressively loaded. Hence, results may be strongly affected by the presence of the instrument itself.

An accurate stress measuring rock support device would be especially beneficial for modified geometry cables because the objective there is to optimize the cable pattern, without overloading and rupturing the cable itself. With modified geometry cables, the principal mode of failure is usually the tensile rupture of the steel cable. Thus, rupture of such cables is predictable; it occurs at or around 25 tonnes axial load in a single strand cable and it is therefore important to know when such load is being approached.

As a matter of fact, a modified geometry cable design can be unsuccessful in two ways:
(1) if single strand cable loads exceed 25 tonnes, cable rupture results in immediate falls of ground, and
(2) if cable loads are very low (e.g. 10–15 tonnes), the design is overconservative and hence unduly costly.

Furthermore, as mining proceeds, mining induced stress changes may result in delayed failures. The stress measuring instrument output may be used to gain a better understanding of stand-up time and to provide an indication of imminent failure. Such data are useful for risk assessment in critical areas (e.g. entry vs non-entry areas).

OBJECTS AND SUMMARY OF THE INVENTION

It is an object of the present invention to obviate the disadvantages of the prior art and to provide an efficient stress measuring device that can be used with cable bolts, friction stabilizers and the like in mining and similar applications.

Another object of the invention is to provide a novel instrumentation head assembly for the stress measuring device of the present invention.

Other objects and advantages of this invention will become apparent from the following description thereof.

In its broad aspect, the stress measuring device of the present invention comprises rock support means, such as a cable bolt, a friction stabilizer, or the like, which is provided with an internal longitudinal cavity extending therethrough, such as to accommodate at least one rigid wire or filament, one end of which is anchored at a predetermined anchor point or points when there are more than one such wire or filament within the cavity, and the other end (or ends) is connected to a longitudinally movable spring-loaded actuator having an electrical contact to a linear displacement sensing means, such as a linear potentiometer or a linear voltage displacement transducer (LVDT), measuring the movement of the actuator and thus the elongation or stretch of the rock support means due to stresses in the rock. The measurement of the displacement of the actuator may thus be correlated to the tensile load or strain produced by the stresses in the rock strata.

When associated with a cable bolt, the stress measuring device of the present invention may comprise a conventional 7-wire stranded cable or a modified cable, such as a bulge, nutcase or Garford™ bulb cable, having a plurality of equispaced nodes or protuberances formed along its length, and one or more rigid wires or filaments such as torsion straightened music wires, extending along an internal longitudinal cavity provided in the cable, for example, in the form of a flat or groove scribed on a central kingwire, or preferably in the form of a hollow space extending through the centre of a tubular kingwire, and anchored at predetermined anchor points which may correspond with the above-mentioned equispaced nodes. In the case of hollow stabilizers, they are ab initio provided with the required internal cavities in which the stress measuring rigid wires or filaments can be inserted and anchored.

Unlike previous devices, the novel arrangement allows the instrumentation (other than the readout instrumentation head assembly) to be essentially completely encapsulated within the rock support means, ensuring that it looks and acts substantially identically to its uninstrumented equivalent, while being well protected. The instrument effectively measures wire or filament displacement between each anchor and the spring loaded actuator at the other end and can, therefore, be used to monitor tensile cable load or strain and the factor of safety against rupture. The instrument can be readily calibrated to give effective cable load measurements.

Within the most preferred embodiment of the present invention, when a cable bolt is instrumented, the central kingwire of a suitable cable is made hollow, i.e. it is in the form of a tube, and a rigid wire or filament or a plurality of such rigid wires or filaments are installed in the interior hollow space of the tube where such wires or filaments are anchored at predetermined anchor points to provide appropriate measurement of their displacement due to the deformation or stretch of the cable and thus of the stress to which the cable is subjected. The rigid wire(s) or filament(s) exit from the outer bottom end of the tubular kingwire and are connected to an instrumentation head assembly having an appropriate linear potentiometer or LVDT, which is connected to a readout means or display unit for a periodic or continuous readout or display of the displacement of the actuator(s) located within the instrumentation head assembly at the end of the rigid wire(s) or filament(s), thereby measuring the cable load which can be correlated to such displacement. When a plurality of such rigid wires or filaments is used, they provide an even more accurate stress measurement. In such a case, spring loaded, torsion straightened wires are anchored within the hollow kingwire or other longitudinal cavity at various distances. Stretch of the cable is then translated to the actuators at the instrumentation head by these wires. When using friction stabilizers, the rigid wires are anchored to their walls and run in the central hollow space thereof. Use of six such wires in association with two diametrically opposed triple linear potentiometers enclosed within the instrumentation head assembly is particularly advantageous.

It should be mentioned that the principle of operation of the stress measuring device of the present invention is based on that used in borehole extensometers for monitoring relative mass displacements in a borehole drilled in rock or the like. One such extensometer is described in U.S. Pat. No. 4,719,803 of Jan. 19, 1988. In such extensometer the anchor points are made with contacting means which engage the borehole wall and linear displacement sensing means are arranged to measure the relative mass displacement as a variation in distance between the anchor members within the borehole. Borehole extensometers are known to be accurate and reliable.

It was surprisingly found that a similar principle could be applied to a stress measuring device of the present invention, where the anchor point or points can be established using rigid wires or filaments within the cable bolts or dowels or stabilizers or similar rock support means to monitor stress within the so supported rock formation by measuring the displacement produced by such wires or filaments due to cable deformation resulting from such stress. The novel device can be made compact and inexpensive, with simple rigid wires or filaments used for stress measurement.

BRIEF DESCRIPTION OF THE DRAWINGS

The present invention will now be described with reference to the accompanying drawings, in which:

FIG. 2 is a cross-sectional view of a standard 7-wire cable bolt commonly used for rock support purposes;

FIG. 3 is a cross-sectional view of a cable bolt according to one embodiment of the present invention where the kingwire is hollow or tubular;

FIG. 4 is a perspective view of a portion of the kingwire shown in FIG. 3;

FIG. 13 illustrates the instrumentation head assembly suitable for the purposes of the present invention;

FIG. 14A and FIG. 14B illustrate in greater detail the instrumentation within the head assembly;

DETAILED DESCRIPTION OF THE INVENTION

Figure 1:
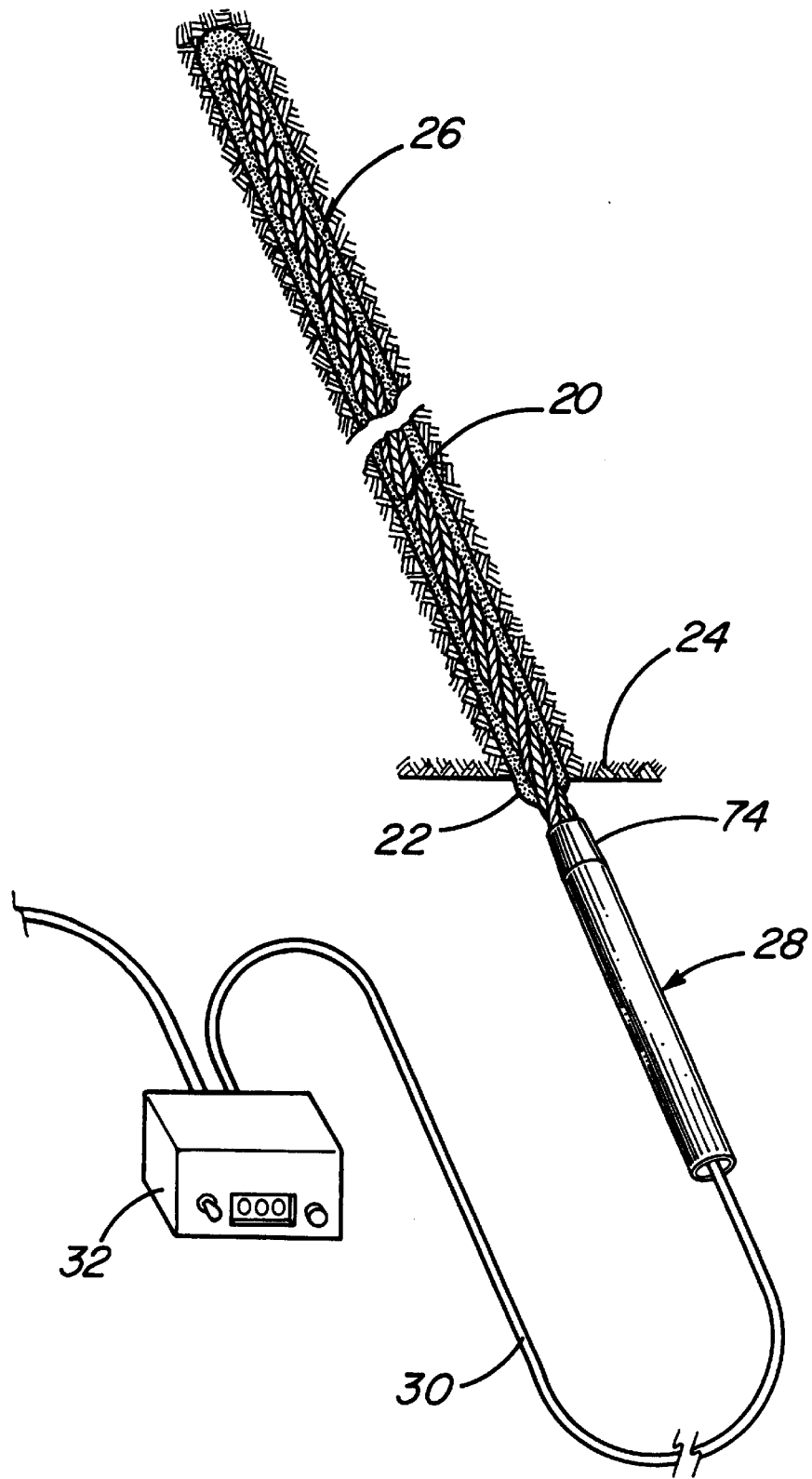
FIG. 1 is an illustration of an instrumented cable bolt grouted within a borehole in the rock with the instrumentation head assembly provided at its outer end for measuring stresses in the rock.

FIG. 1 illustrates the general arrangement of a stress measuring cable bolt in accordance with the present invention. In this figure, cable 20 is grouted in borehole 22 drilled in a rock strata 24. Grout 26 is preferably made using at least 0.4 water/cement ratio, particularly when cable 20 is a modified cable where good penetration of the grout into the nodes is required. At the outer end of the cable 20, which exits from the borehole 22, there is connected by sleeve 74 a stress measuring instrumentation head assembly 28 using a linear potentiometer or an LVDT to measure any deformation or stretch in the cable 20 produced by the stress in the rock 24. The head assembly 28 is connected by means of an electrical cable 30 to a display unit 32 which is calibrated to indicate the tensile load or strain imparted onto the cable 20.

If cable 20 were a standard 7-wire stranded cable having an arrangement of wires where the central kingwire 34 is fully surrounded by peripheral wires 36, as shown in cross-section in FIG. 2, it would not be suitable for the purposes of the present invention which requires an internal longitudinal cavity or void in the cable to accommodate rigid wires or filaments anchored at predetermined anchor points and used to measure the strain or tensile load imparted to the cable.

Thus, in the case of a cable bolt, the most preferred embodiment in accordance with the present invention provides an arrangement of wires where a hollow or tubular kingwire 38 is used as illustrated in cross-section in FIG. 3 and in perspective in FIG. 4. The hollow space 40 in this tubular kingwire should be sufficient to accommodate the desired number of rigid wires or filaments. For example, the kingwire 38 may be formed of a hollow steel tube having an outside diameter of 5.31 mm and an inside diameter of 3.5 mm for use in a 15.2 mm low relaxation 7-wire stranded cable. The cross-sectional area of the hollow kingwire is thus reduced by about 6% compared to the total cross sectional area of the cable. This produces a 3–4% reduction in rupture capacity compared to those set out in ASTM A416 recommendation. This, however, is quite acceptable having regard to the fact that the resulting cable bolt provides an accurate measurement of the loads to which the cable is subjected. Furthermore, response can be improved using fully tempered (work hardened) as opposed to annealed stainless steel for the tubular king wire, or specially alloyed steel that would produce loads very close to the ASTM A416 recommendation despite the tubular shape of the kingwire.

Figure 5:
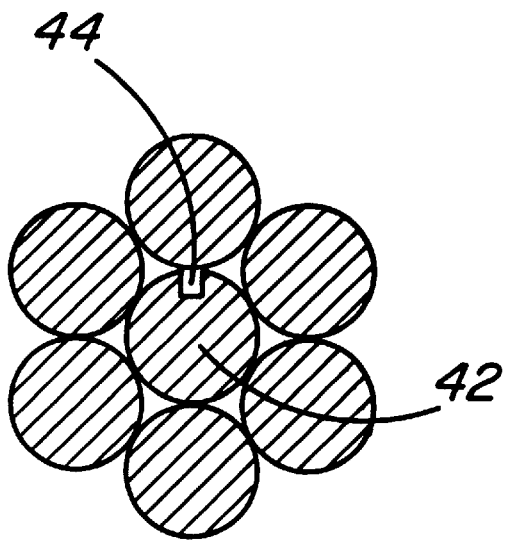
FIG. 5 is a cross-sectional view of a cable bolt according to another embodiment of the present invention where the kingwire is provided with a longitudinal groove.
Figure 6:
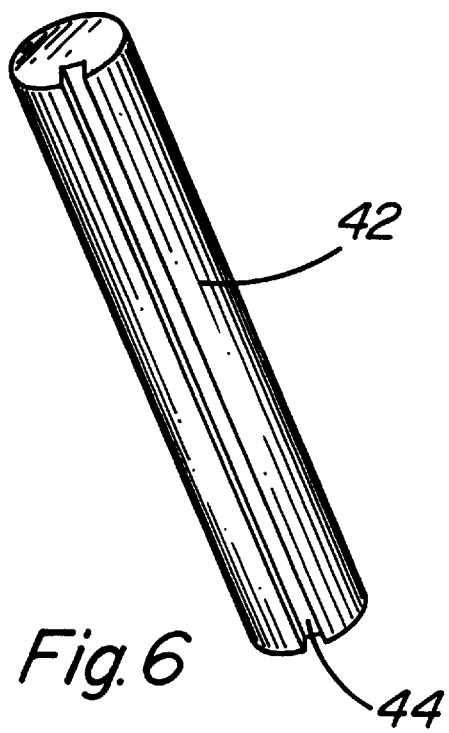
FIG. 6 is a perspective view of a portion of the kingwire shown in FIG. 5.

In lieu of a tubular kingwire 38 shown in FIG. 3 and FIG. 4, one can also use, for example, a longitudinally grooved kingwire 42 illustrated in FIG. 5 and FIG. 6 where the groove 44 should be large enough to accommodate the desired number of the rigid wires or filaments.

Figure 7:
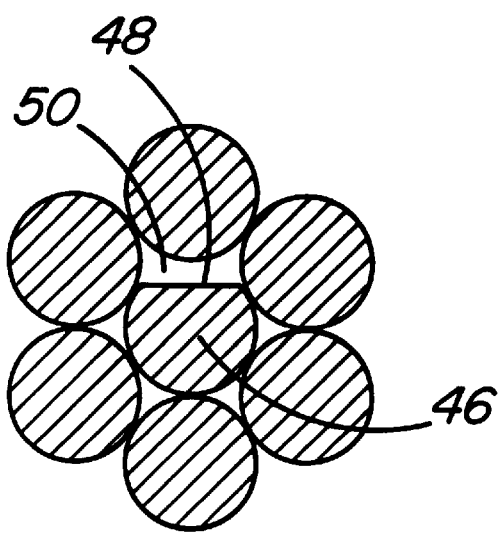
FIG. 7 is a cross-sectional view of a cable bolt according to another embodiment of the invention, in which the kingwire is flattened.
Figure 8:
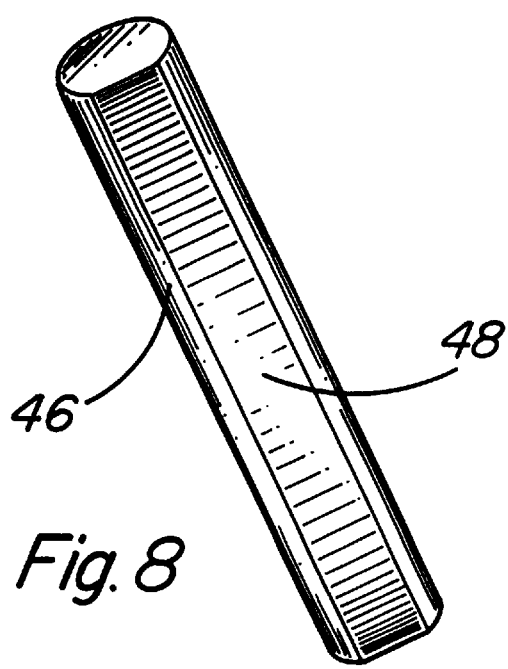
FIG. 8 is a perspective view of a portion of the kingwire shown in FIG. 7.

Furthermore, instead of a grooved kingwire 42, one can also use a flattened kingwire 46 as illustrated in FIG. 7 and FIG. 8 with the flat section 48 being such as to provide a suitable longitudinal void or space 50 large enough to accommodate the rigid wires or filaments.

It should, therefore, be understood that any arrangement of cable forming wires that produces a suitable internal longitudinal cavity or space within the cable bolt would be satisfactory for the purposes of the present invention.

Figure 9:
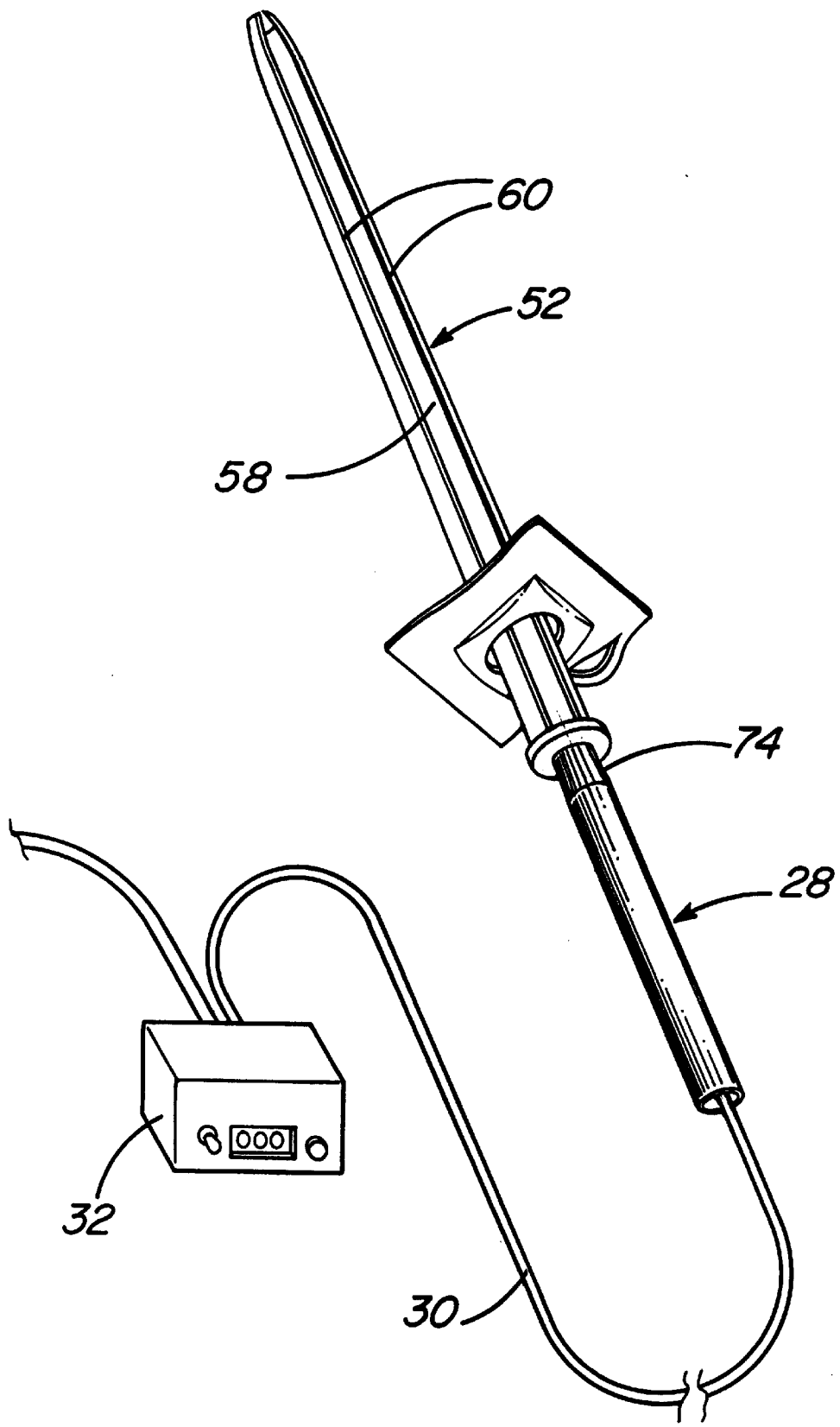
FIG. 9 is a perspective view of a Split Set™ stabilizer used for rock support and stabilization purposes, showing its interior hollow portion and the split in its body and the instrumentation head assembly at its outer end.

Apart from the cable bolts, the invention may be applied to friction stabilizers, such as the Split Set™ stabilizer illustrated in FIG. 9. Here, the stabilizer 52 extends into a borehole such as borehole 22 in FIG. 1 and has an interior hollow space 58 which is amply sufficient to accommodate the rigid wires or filaments and, in addition, it also has a split 60 in its body that can be used for mounting such rigid wires or filaments within the hollow space 58. At the outer end of the stabilizer 52, outside of the rock body, there is connected via sleeve 74 an instrumentation head assembly 28 such as already shown in FIG. 1, itself connected by electrical cable 30 to an appropriate display unit 32.

Figure 10:
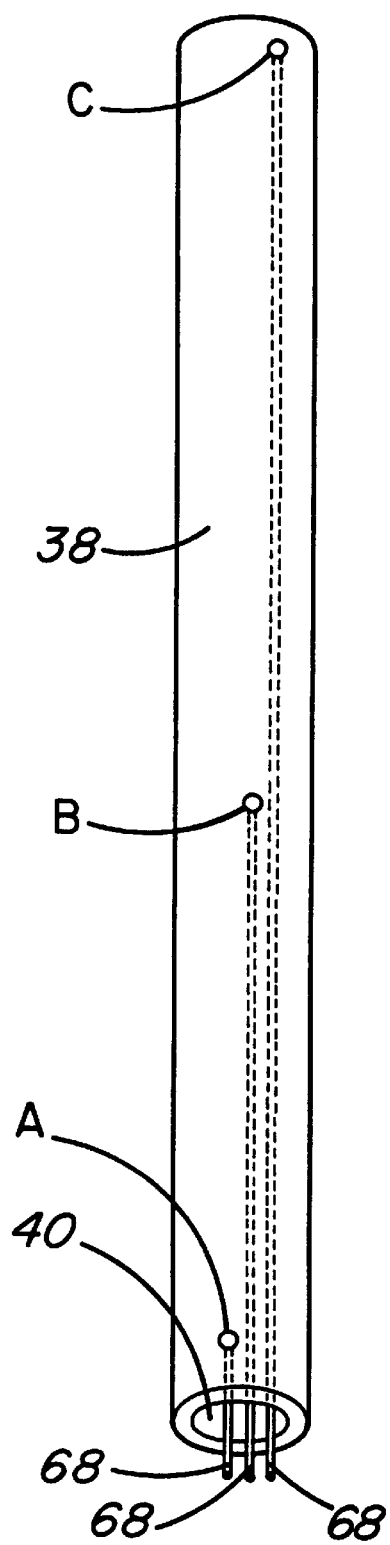
FIG. 10 is a perspective view of a tubular kingwire with three rigid wires running within the hollow space and anchored at one end thereof through holes made in the kingwire's wall.

In FIG. 10, there is shown a hollow kingwire 38 in the internal hollow space 40 of which there are provided three rigid wires 68 which are anchored within the hollow space 40 to the wall of the kingwire 38 at anchor points A, B, and C. This can be done by drilling small holes in the wall of the kingwire 38 at these anchor points and inserting the wires 68 through these holes and then welding or otherwise anchoring one end of each of these wires 68 at the appropriate anchor point. For example, as suitable wires 68, one may use a torsion straightened music wire 0.020 mm in diameter. A non-metallic filament having the required strength and rigidity would also be suitable.

The rigid wires 68 exit from the kingwire 38 (and thus from the cable) at the outer or bottom end of the cable and enter the instrumentation head assembly 28 which will be described further below.

Figure 11:
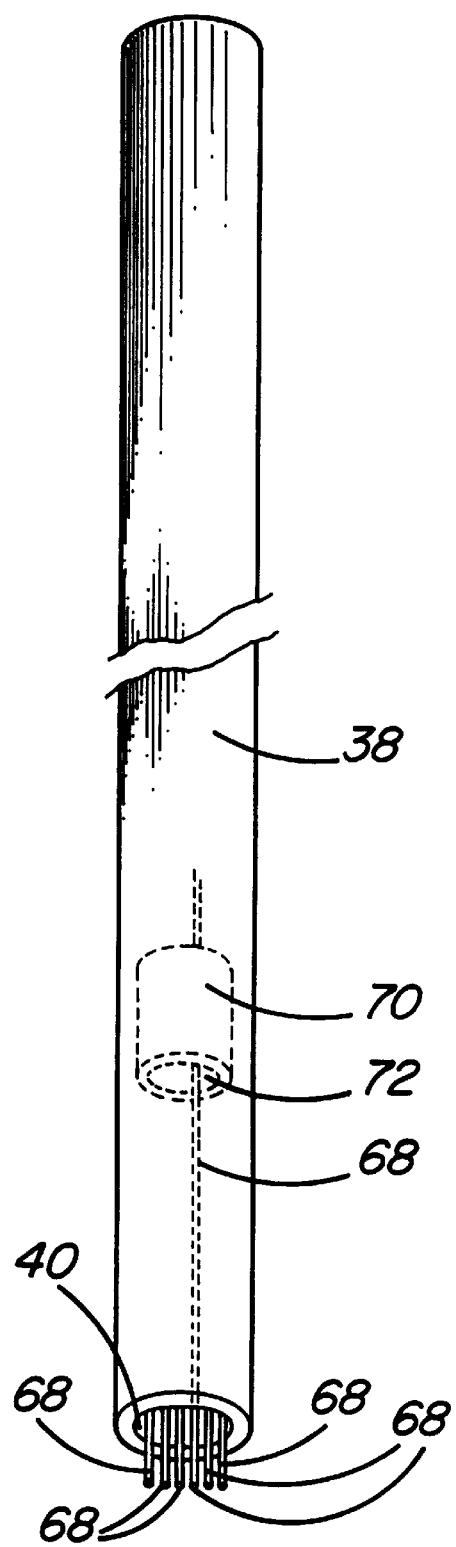
FIG. 11 is a perspective view of a hollow kingwire similar to the one shown in FIG. 10, but with six rigid wires running within the hollow space anchored by means of hollow plugs within the kingwire.

In FIG. 11, an arrangement similar to that shown in FIG. 10 is illustrated, however here the kingwire 38 has six rigid stress measuring wires 68 within its internal hollow space 40. Each wire 68 is anchored to a hollow plug 70 secured to the interior of the hollow kingwire 38 at a predetermined anchor point. The hollow plug 70 can be, for example, an epoxy resin plug set in place by a pin (not shown) which penetrates the wall of the kingwire tube or it can be secured by a suitable adhesive. The remaining wires will pass through the central hole 72 of the plug 70 to be anchored at locations further along the cable.

Although FIG. 10 and FIG. 11 illustrate an arrangement in which stress measuring wires 68 are anchored within a tubular kingwire 38, it should be understood that in lieu of the tubular kingwire 38, one can use other kingwire arrangements as shown, for example in FIG. 5 to FIG. 8. Moreover, such arrangements can be used with any cable bolt, including modified cables, such as the nutcase cable, bulge cable, Garford™ cable and the like. The anchoring can be done in any suitable manner, such as welding, plugging, attachment with a strong adhesive, or any combination of such methods. When grouting of the cable is used and the stress measuring wires 68 are in a system such as shown in FIG. 5 to FIG. 8, they are preferably greased so that they will not be immobilized by the grout.

Furthermore, the arrangements shown in FIG. 10 and FIG. 11, although shown in conjunction with a hollow kingwire, are applicable to any hollow rock support means, such as, for example, the stabilizer shown in FIG. 9.

Figure 12:
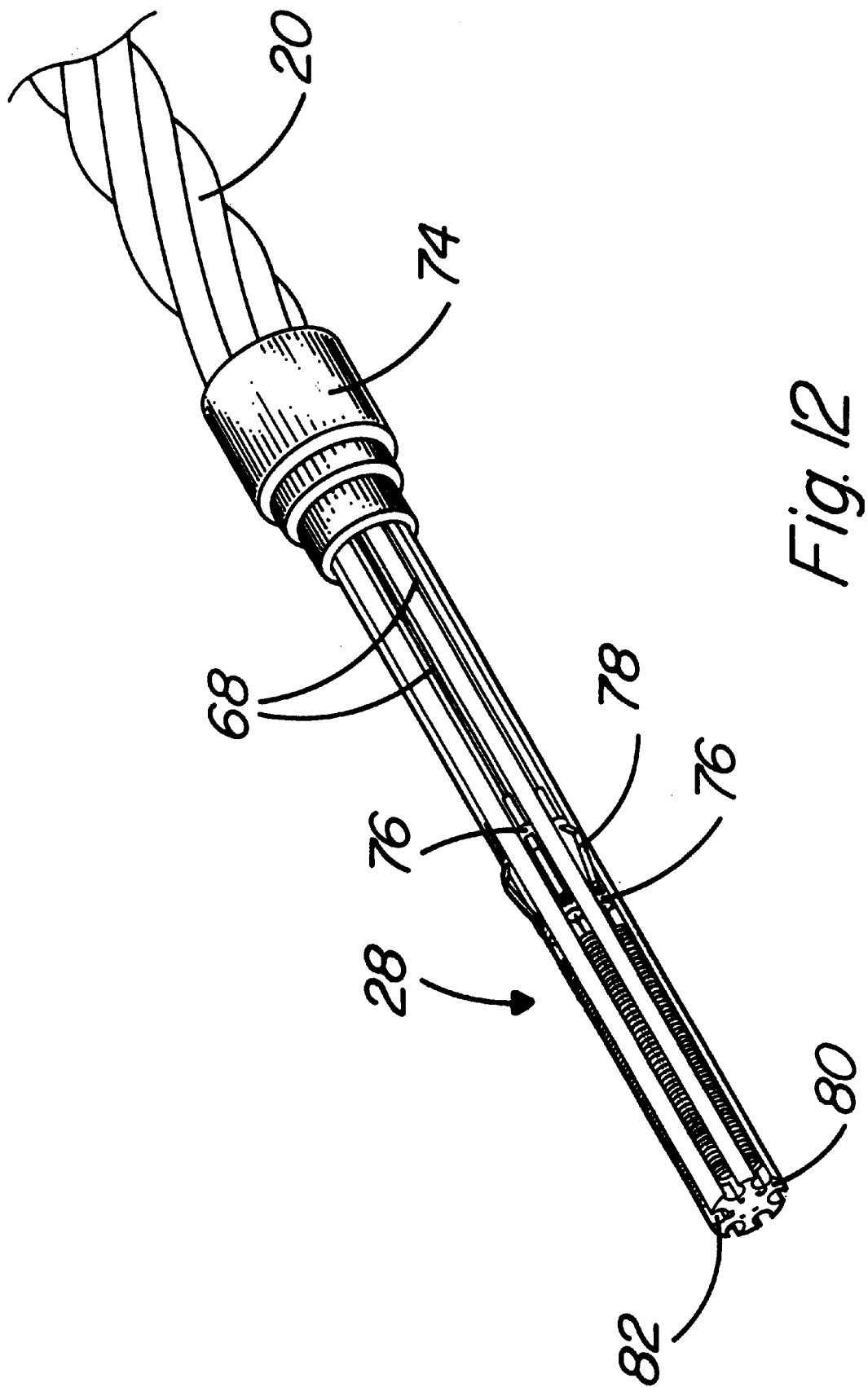
FIG. 12 illustrates the attachment of a cable bolt to the internal mechanism of the instrumentation head assembly.

Referring to FIG. 12, it illustrates how the cable 20 of the present invention is attached to the instrumentation head assembly 28 which is shown herein without its outer coverings. For this purpose, there is provided a connecting sleeve 74 which connects the outer end of cable 20 to the instrumentation head assembly 28 without impeding the movement of rigid wires 68. In this particular embodiment, there are six wires exiting from cable 20 through sleeve 74. At their outer ends, these wires are connected to cylindrical or tubular actuators 76 which have outwardly projecting wipers 78. The actuators 76 are spring-loaded and are inserted into a star-shaped guiding member 80 having six semi-circular grooves 82 set out in a hexagonal arrangement, in which said actuators 76 are adapted to move in the longitudinal direction.

As shown in FIG. 13, the guiding member is then covered with a hexagonal cover 84 which may be made of two longitudinally separable halves in each of which a triple linear potentiometer is mounted. The electrical wires 86A and 86B are connected to each such potentiometer and from it lead to a suitable display unit through cable 30 as well as to an electrical outlet as illustrated in FIG. 1 and FIG. 9. To maintain the two halves of the hexagonal cover 84 together, they may be inserted into a tubular cover 88.

FIG. 14A and FIG. 14B show an enlarged illustration of the instrumentation head arrangement according to this embodiment of this invention. Thus, rigid wires 68 coming out of the rock support means are attached at their outer ends to cylindrical actuators 76 having outwardly projecting wipers 78. These actuators 76 move in the longitudinal direction in semi-circular grooves 82 provided in the star-shaped guiding member 80. The actuators 76 and thus the wires 68 are spring-loaded by means of springs 90. This arrangement is covered by a hexagonal cover 84 made of two identical semi-hexagonal halves 84A and 84B. Each of these halves is provided with a triple linear potentiometer with one potentiometer membrane 92 mounted on each hexagonal wall of the cover 84A and 84B. Leads 94 from such potentiometers are then connected via appropriate wiring 86A, 86B (FIG. 13) to the electrical outlet and display unit.

Such an assembly is simple, inexpensive and easy to calibrate. When the wipers 78 touch the potentiometer membrane 92 and the system is made operational, the display device will be calibrated to show, let us say zero (0), on the display unit. Then, any movement of the actuator 76 and thus of the electrical contact produced by wipers 78 will display a reading that may readily be correlated to determine the load or strain applied to the cable as a result of the stresses in the rock. Unlike the situation in resistance wires where 0.1 of a volt provides a significant output, making the resolution and the calibration difficult, in this case we have outputs of the order of 5 volts which provide a much simpler calibration and a much more accurate reading.

It should be pointed out that instead of six rigid wires 68, one can use less or more with appropriate adjustments to the instrumentation head. This depends on the desired monitoring. In some cases, one rigid wire or filament with a single linear potentiometer may be sufficient, while in others, a number of such wires would be required.

Moreover, instead of a linear potentiometer, one can use a linear voltage displacement transducer (LVDT) although it is somewhat bulkier and would require a larger instrumentation head.

Figure 15:
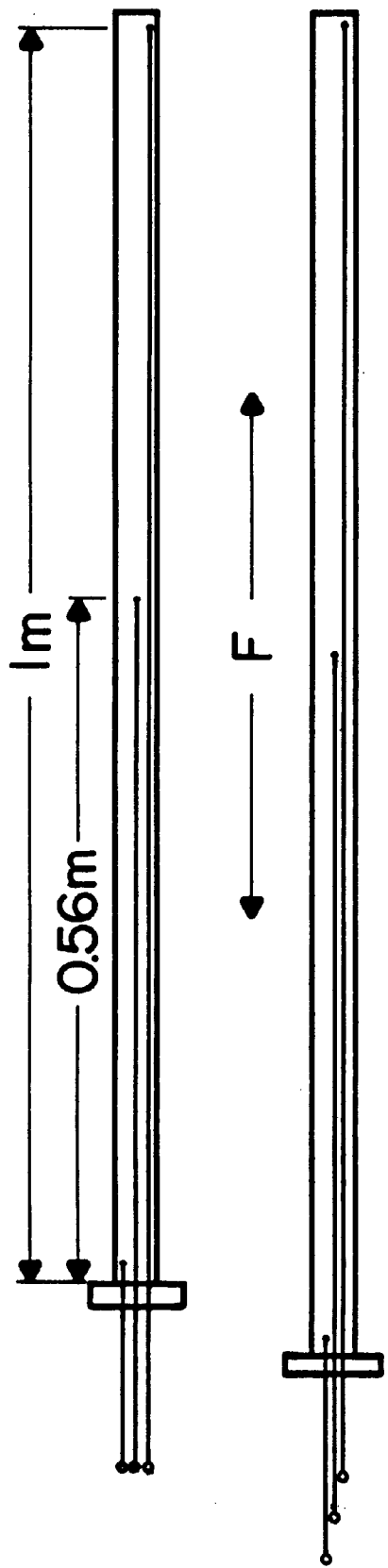
FIG. 15 is a diagrammatic illustration of a triple anchor point prototype that has been tested within the scope of the present invention.

To illustrate the correlation between a measured stretch to which a rock support device may be subjected and the load or force (F) applied, a triple anchor point prototype cable bolt was built as diagrammatically illustrated in FIG. 15.

Figure 17:
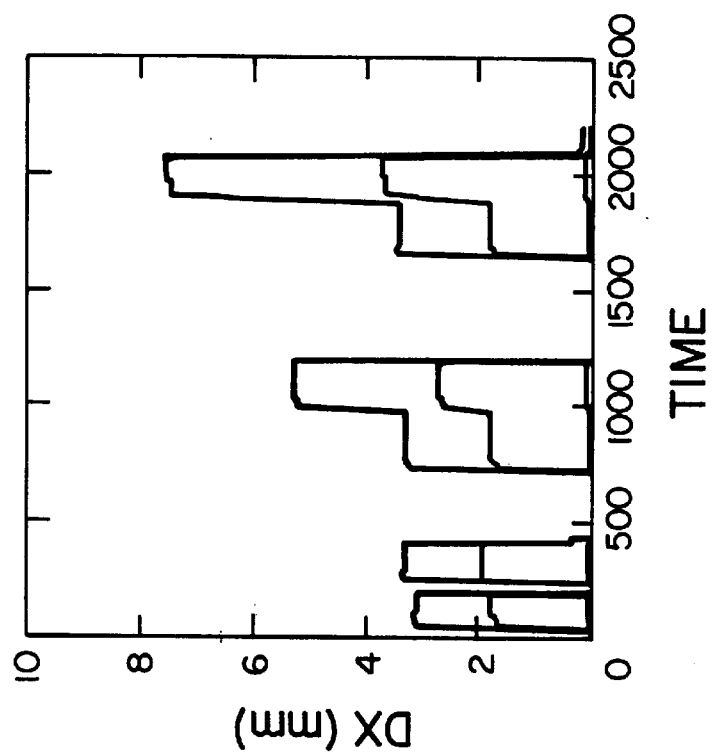
FIG. 17 is a graph of cable stretch (DX) versus time obtained as a result of the force (F) applied to the prototype illustrated in FIG. 15.
Figure 16:
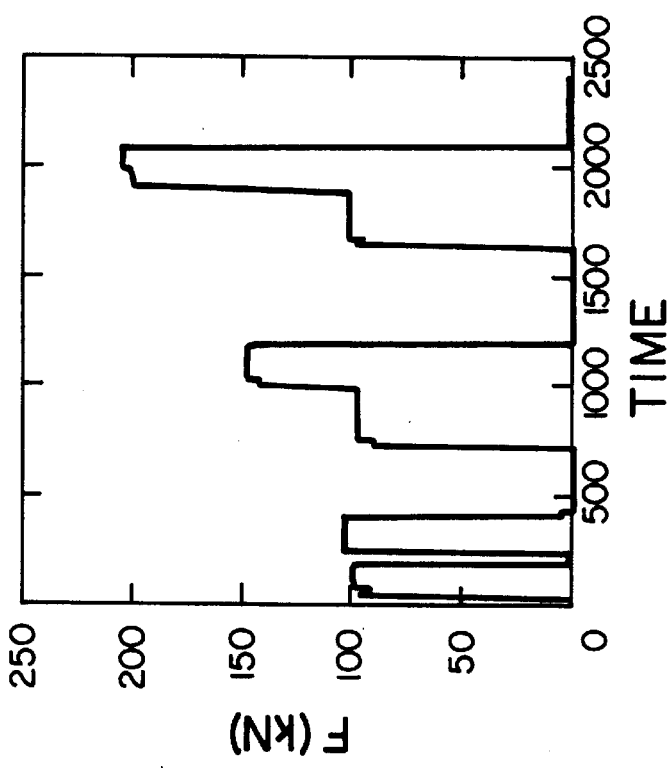
FIG. 16 is a graph showing the force (F) versus time in a prototype illustrated in FIG. 15.

Initially, the three wires were anchored as follows: one at the 1 meter length from the outer or exit end of the cable; one at 0.56 meter from such end; and one very close to the exit end of the cable. Then, force F was applied to the cable bolt, resulting in the displacement of each wire. The measurement of this displacement through the instrumentation head as described above provided graphical results shown in FIG. 16 and FIG. 17 respectively. Thus, in FIG. 16, the applied force (F) versus time is plotted and in FIG. 17 the measured cable stretch (DX) versus time is plotted as determined by displacement of each wire. It is clear from these graphs that there is a very good correlation between the force applied and the resultant stretch which can be readily measured and displayed using a linear potentiometer or an LVDT.

The present invention provides a number of important advantages over the prior art systems. The novel instrument can be used with any type of stranded cable, friction stabilizer or similar support means used for reinforcement of rock strata or concrete structures or any other application where such devices are used. Thus, when reference is made to a "rock support device" it includes such devices for any application. Unlike other known devices, the instrumentation, consisting of rigid wires or filaments, is enclosed within the device, insuring that the cable, stabilizer and the like looks and acts essentially identically to its uninstrumented equivalent.

It should, of course, be understood that the invention is not limited to the specific embodiments described above, but that many modifications obvious to those skilled in the art can be made without departing from the spirit and scope thereof. For instance, a remote readout may be provided when dealing with adverse mining conditions. Also, a computerized correlation and analysis of the data may be implemented.

Thus, the present invention should be interpreted broadly, having regard to the following claims.

We claim:

1. A stress measuring rock support device which comprises rock support means having an internal longitudinal cavity extending therethrough such as to accommodate a plurality of rigid wires or flat which extend in said cavity and each of which is anchored at one of its ends at a predetermined anchor point within said cavity and at its other end is connected to a longitudinally movable spring-loaded actuator provided with an electrical contact to a linear displacement sensing means so as to measure any movement of the actuator caused by displacement of said rigid wired or filaments produced by deformation of the rock support means due to tensile load or strain applied to said rock support means by the stress occurring in the rock.

2. A stress measuring rock support device which comprises a cable bolt comprising a central kingwire surrounded by a plurality of stranded peripheral wires, said cable bolt having an internal longitudinal cavity extending therethrough such as to accommodate at least one rigid wire or filament which extends in said cavity and is anchored at one of its ends within said cavity and at its other end is connected to a longitudinally movable spring-loaded actuator provided with an electrical contact to a linear displacement sensing means so as to measure any movement of the actuator caused by displacement of said rigid wire or filament produced by deformation of the rock support means due to tensile load or strain applied to said rock support means by the stress occurring in the rock.

3. A stress measuring rock support device according to claim 2, in which said internal longitudinal cavity is produced by making the kingwire hollow or tubular.

4. A stress measuring rock support device according to claim 2, in which said internal longitudinal cavity is produced by scribing a groove over the length of the kingwire.

5. A stress measuring support device according to claim 2, in which said internal longitudinal cavity is produced by flattening a portion of the kingwire over the length of said kingwire.

6. A stress measuring rock support device according to claim 2, in which the cable of the cable bolt is a modified cable having nodes or protuberances of increased diameter at predetermined intervals, thereby providing increased surface area of the cable and improved hold within a borehole when the cable is grouted therein.

7. A stress measuring rock support device according to claim 2, which is grouted in a borehole using a grout with at least 0.4 water/cement ratio.

8. A stress measuring rock support device according to claim 7, in which the rigid wire or filament is greased so as to avoid being immobilized by grout.

9. A stress measuring support device according to claim 1, in which said rock support means is a friction stabilizer with a hollow interior and a longitudinal split in its body.

10. A stress measuring rock support device according to claim 2, in which a plurality of rigid wires or filaments is used, each anchored at a predetermined anchor point within the cavity in which they are located.

11. A stress measuring rock support device which comprises rock support means having an internal longitudinal cavity extending therethrough such as to accomodate at least one rigid wire consisting of a torsion straightened musical wire which extends in said cavity and is anchored at one of its ends within said cavity and at its other end is connected to a longitudinally movable spring-loaded actuator provided with an electrical contact to a linear displacement sensing means so as to measure any movement of the actuator caused by displacement of said rigid wire produced by deformation of the rock support means due to tensile load or strain applied to said rock support means by the stress occurring in the rock.

12. A stress measuring rock support device according to claim 1, in which the linear displacement sensing means is a linear potentiometer.

13. A stress measuring rock support device according to claim 1, in which the linear displacement sensing means is a linear voltage displacement transducer (LVDT).

14. A stress measuring rock support device according to claim 1, in which the spring-loaded actuator with its electrical contact and the linear displacement sensing means are enclosed within a suitable instrumentation head assembly connected to the outer end of the rock support means so as not to impede free movement of the rigid wires or filaments.

15. An instrumentation head assembly for a stress measuring rock support device wherein a plurality of rigid wires or filaments projects from an outer end of rock support means wherein they are anchored, said head assembly comprising:

(a) a grooved guiding member having a groove for each rigid wire or filament;

(b) a longitudinally movable actuator within each groove having electrical contact means projecting outwardly therefrom said actuator being connected to the extremity of the rigid wire or filament at one end and being spring-loaded at the other;

(c) linear displacement sensing means mounted so that said electrical contact means are capable of actuating the same; and (d) a cover to enclose items (a) to (c) and to hold them together.

16. An instrumentation head assembly according to claim 15, in which the grooved guiding member is star-shaped with six semi-circular longitudinal grooves arranged around its periphery.

17. An instrumentation head assembly according to claim 16, in which the actuator is a cylindrical or tubular element longitudinally movable in each groove and spring-loaded so that it may be positioned at a predetermined point within the groove for calibration purposes.

18. An instrumentation head assembly according to claim 17, in which the electrical contact means include a wiper mounted on the surface of the actuator and projecting outwardly therefrom so as to contact actuating membranes of the linear displacement sensing means.

19. An instrumentation head assembly according to claim 18, in which the linear displacement sensing means consist of two triple linear potentiometers with the actuating membranes mounted so that the wipers may be in constant contact therewith.

20. An instrumentation head assembly according to claim 19, in which the cover is formed of two semi-hexagonal halves, each half having one triple linear potentiometer mounted on the inside thereof so that when both halves of said cover enclose the items of the instrumentation head assembly, each wiper will touch one potentiometer actuating membrane.

21. An instrumentation head assembly according to claim 20, in which the two semi-hexagonal halves of the cover are held together by inserting them within a tubular enclosure.

22. An instrumentation head assembly according to claim 15, which is connected to the rock support means by a sleeve connector that does not impede the movement of the rigid wires or filaments passing through said sleeve connector.

23. An instrumentation head assembly according to claim 15, which is electrically connected to a display unit that displays a reading of any movement of the actuator within each groove of the grooved guiding member.

24. An instrumentation head according to claim 23, in which said display unit also provides correlation between the movement of the actuator and tensile load exerted on the rock support means.

* * * * *